INVENTORS
FRANK OSTER
STANLEY L. ROSENBERG
BY Eugene S. Lovette
ATTORNEY

INVENTORS
FRANK OSTER
STANLEY L. ROSENBERG
BY Eugene S. Lovette
ATTORNEY

Oct. 30, 1962 F. OSTER ET AL 3,061,670
MEANS FOR TRANSMITTING VIDEO INFORMATION
OVER TRANSMISSION LINES
Filed Jan. 30, 1961 3 Sheets-Sheet 3
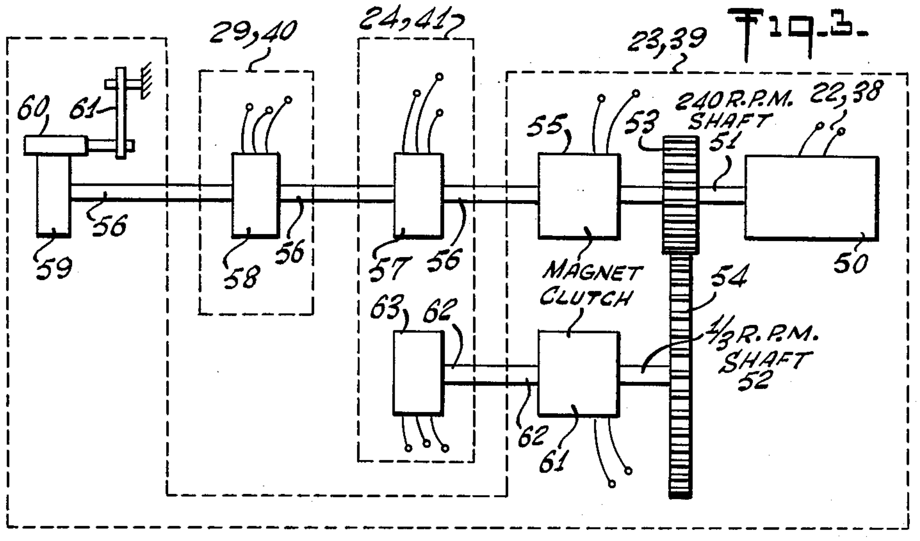
Fig. 3
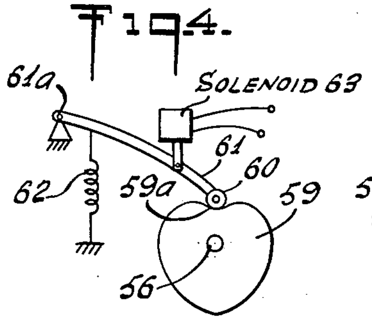
Fig. 4
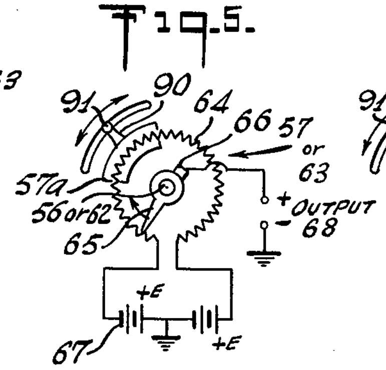
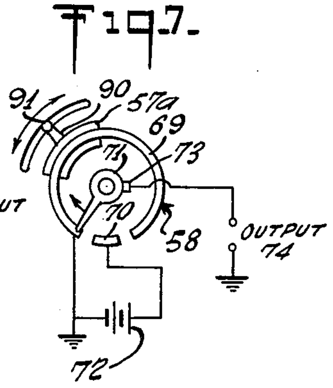
Fig. 5 Fig. 7
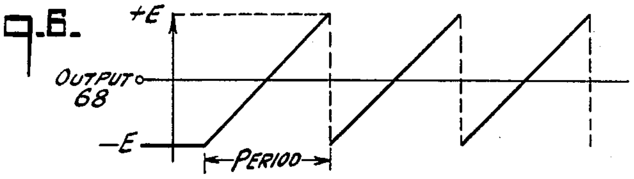
Fig. 6
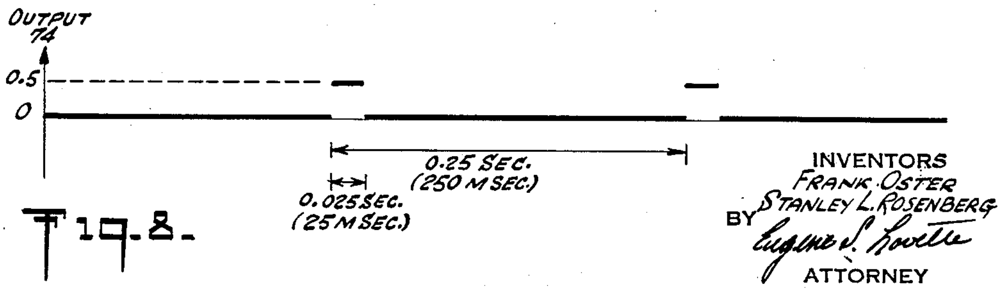
Fig. 8
INVENTORS
FRANK OSTER
STANLEY L. ROSENBERG
BY Eugene S. Lovette
ATTORNEY United States Patent Office 3,061,670

Patented Oct. 30, 1962

3,061,670
MEANS FOR TRANSMITTING VIDEO INFORMATION OVER TRANSMISSION LINES

Frank Oster, Brooklyn, and Stanley L. Rosenberg, Great Neck, N.Y., assignors to Telectro Industries Corporation, Long Island City, N.Y., a corporation of New York Filed Jan. 30, 1961, Ser. No. 85,866
12 Claims. (Cl. 178—6.8)

This invention relates to a system for transmitting picture information through telephone lines to a remote location in a relatively short period of time and, in particular, relates to a system for taking a picture by television camera means and for transmitting such picture through telephone lines to remote locations whereby the picture may be displayed on television receiver tube means at the receiving end.

One feature of the system built in accordance with the principles of these improvements includes the use of a storage tube on which a picture seen by the television camera is written and stored at a relatively fast speed, i.e., one-thirtieth of a second, and later read out at a slow speed in the order of three minutes, whereby the stored information can be transmitted to telephone lines. This means that in a period of a fraction more than three minutes of time, actions or other information occurring at a first location can be actually read or seen at remote location television receivers whereby the separation between the camera and the receiver stations is restricted only by the length of the connecting telephone lines. Transmission of picture information through telephone lines in accordance with prior art systems requires time consuming process to convert the picture information into electrical form signals to be sent through the telephone wires. After the information is received at the receiving end, the prior art systems also require an appreciable time interval before the picture is seen.

A feature of fast speed picture transmission and reproduction in accordance with the practice of the instant invention adapts the system to a very large number of applications. Following, are a few typical applications where the fast speed picture transmission and reproduction is very much appreciated:

(*a*) Weather services for furnishing immediate weather maps and radar reports for airlines, shipping, etc.;

(*b*) News agencies including newspapers, radio and television for the immediate worldwide dissemination of on-the-spot news pictures, live scenes, charts and illustrations;

(*c*) Hotels, resorts, travel agencies, airlines, shipping lines, and railroads can establish central information points concerning reservations, availability of accommodations and schedules;

(*d*) Armed services for transmission of data concerning aerial reconnaissance, camouflage detection, actual battle scenes for command evaluation, records and orders, codes (scrambled and decoded) and other logistical data; and (*e*) Sporting events for recording photo-finish in races and producing immediate results without photo processing.

In transmitting picture information from one point to the other in electrical form, the picture is cut into many horizontal strips and for each strip a variable voltage or current is generated in a manner to correspond to the brightness variation of each strip. If there are five hundred strips, there would be five hundred different such voltage or current variations. Actual generation of this electric voltage or current is done by a scanning device in the television camera. This scanning device sweeps each mentioned strip from left to right starting from the top strip to the bottom strip and while sweeping the picture it generates electric voltage or current proportional to the brightness of the spot at which the scanning device is on.

The video information generated by the scanning device is transmitted to the receiving end either in modulated form or directly. When the video information is received at the receiver, the information must be properly translated back to a picture. In doing so, there are several requirements that have to be met by both the transmitter and receiver. First of all, if the information is transmitted in modulated form, it must be demodulated in direct video information. Next, the electrically converted video information must be converted back to bright or dark light information, i.e., a trace of brighter spot for higher electrical voltage and darker spot for lower electrical voltage, etc. Next requirement is to trace these bright and dark spots on a proper position of the screen. This means the scanning devices in the transmitter and the receiver must be sweeping the screens in perfect synchronism. All these requirements, except the last one, are met by conventional means as in ordinary television apparatus. The last requirement of synchronizing the transmitter and receiver is met in convention television apparatus by use of electronic saw-tooth wave generators whose frequencies are controlled by a frequency reference common to both receiver and transmitter. The generation of a saw-tooth wave by electronic means is an excellent method of obtaining linear saw-tooth wave. However, the output of this generator is good only when the frequency is fast, i.e., 30 cycles per second and up. For the invention herein, the picture must be set in very slow speeds through telephone lines. The system requires two saw-tooth waves of frequencies, 4 cycles per second and 0.00556 cycle per second (equivalent of one sweep in 3 minutes). For such low speed saw-tooth wave generation, the electronic generator output is not linear and it is hard to synchronize two generators.

Hence, the invention employs electro-mechanical means to generate perfectly synchronized low frequency linear saw-tooth waves.

It is the principal object of this invention to provide an electrical system which will take a picture of any object and transmit the picture over telephone lines and display the picture on a television picture tube or on some other permanent record in little over three minutes of time.

It is a further object of this invention to provide an automatic control system to operate the system in proper sequence and timing automatically by simply actuating suitable controls.

It is still a further object of this invention to provide electro-mechanical means to synchronize two or more periodic signals.

Further objects and advantages will become apparent from the following description taken in conjunction with the figures, in which:

FIG. 3 shows diagrammatically and schematically a block diagram circuit of the slow period voltage generating means employed in both the transmitter and receiver units in accordance with the invention;

FIG. 4 illustrates diagrammatically and schematically the cam operator device for aligning certain of the voltage generator potentiometer means for proper starting positions;

FIG. 5 illustrates schematically a saw-tooth voltage generator in accordance with the invention;

FIG. 6 illustrates the voltage curve provided by the circuit of FIG. 5;

FIG. 7 illustrates schematically a pulse generator in accordance with the invention; and FIG. 8 illustrates the voltage curve provided by the apparatus of FIG. 7.

Figure 1:
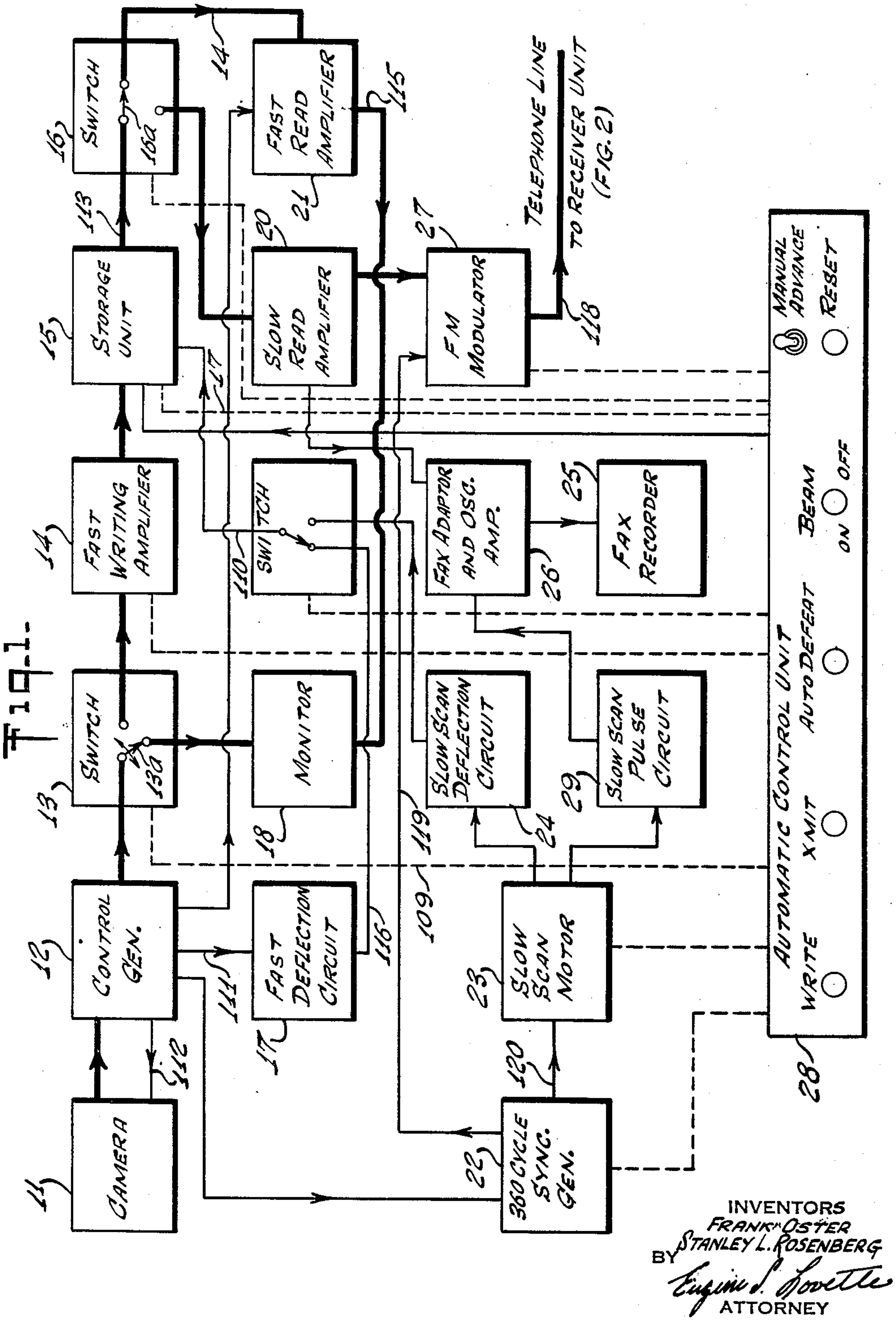
FIG. 1 illustrates schematically and diagrammatically a block diagram circuit constituting a transmitter unit in accordance with the invention.

Reference is now made to the figures, in particular, to FIG. 1. FIG. 1 is a block diagram of the transmitting system in accordance with the principles of the invention. Each block represents a major operating unit or control unit. The heavy lines indicate path and direction of flow of the video signal. The thin lines indicate all other electric signal or information flow interlinking the blocks, and the dotted lines indicate path of the control signals from an automatic control unit 28 to activate each operating unit in proper sequence and timing.

A conventional television camera unit is depicted by block 11. Camera 11 is adapted to take a picture of any object whereby this picture is eventually transmitted to a receiver through telephone lines. A control generator is depicted by block 12. Control generator 12 contains a fixed frequency crystal oscillator which controls the frequency of the fast speed sweeping circuit and also the frequency of a 360 cycle generator 22. Control generator 12 controls the scanning devices in camera unit 11. Control generator 12 also controls a monitor television receiver set 18 through a relay switch unit 13 which relay 13 normally connects monitor set 18 to control generator 12. In this way, the picture taken by camera unit 11 is displayed on monitor set 18 for examination by operating personnel. Since the scanning devices in camera unit 11 and monitor set 18 are controlled by the same control generator 12, there is no problem of synchronizing the two units 11 and 18. When the operator is satisfied with the picture displayed on monitor 18 and approves same for transmission, a button 100 marked "Write" on an automatic controlled unit 28 is actuated to effect such transmission. The following occurs when "Write" button 100 is actuated. Relay switch 13 is actuated through lead 109, whereby its switch blade depicted as 13*a* positions to its alternate setting to connect camera 11 and control generator 12 through the heavy flow lines to a fast writing amplifier 14. Simultaneously with this action, all information stored in the storage tube of a storage unit 15 is erased. After the storage tube is erased, storage unit 15 is primed to receive the writing of new picture information therein. The storage tube used in the illustrated system may be conventional storage tube means and the information is written on the tube by storing electrical charges on the tube screen in proportion to the brightness of the picture information. This storage action requires a large amount of charge cumulation before the start of the actual writing operation. The process of cumulating charges is called "priming." After the prime operation is completed, fast writing amplifier 14 operates through the heavy flow-line to write on the storage tube in storage unit 15.

During the "Write" operation, a switching unit 19 (as seen in FIG. 1) connects a fast deflection circuit 17 to storage unit 15 by lead 110. In other words, the scanning device in storage unit 15 is controlled by fast deflection circuit 17 which in turn is controlled by control generator through lead 111. Here again, one control generator 12 controls both scanning devices in camera 11 (lead 112) and storage unit 15; therefore, there is no problem of synchronism between the pictures of the two units 11 and 15.

As was mentioned before, the writing of information on a storage tube is done by storing electric charges on the screen of the tube with amount of stored charge made proportional to the brightness of the picture at that spot. In this fast speed scanning operation, it takes only one-thirtieth of a second to cover the completed surface of the screen, however, it takes several repeated writings to store a picture with sufficient intensity.

After a sufficient number of writings, the stored picture is read out and displayed on monitor set 18 by a fast read amplifier 21. Amplifier 21 transmits the picture information from storage unit 15 to monitor 18 by means of flow leads 113, 114, 115 and a switch unit 16 when its switch blade 16*a* is positioned as shown in FIG. 1. The "read" operation is simply a check operation to see whether the writing has been performed satisfactorily or not. For this "read" operation, the scanning device in storage unit 15 is controlled by control generator 12 through lead 111, fast deflection circuit 17, lead 116, switch 19 and lead 110. The scanning device in monitor set 18 is also controlled by the same control generator 12 through the fast read amplifier 21. Therefore, there is no problem of synchronism between the sender, storage unit 15, and the receiver, monitor set 18.

The foregoing completes the automatic operation of the transmitter unit after "Write" button 100 on automatic control unit 28 is pressed. During "Write" operation, storage unit 15 undergoes four different modes or steps of operation: namely, erase, prime, write, read. For each of these operations, the storage tube requires different electrode voltages and bias voltages. Automatic control unit 28 provides these necessary changes of electrode voltages and bias voltages. Automatic control unit 28 also contains an oscillator and a pulse counter operating as a timer. The pulse counter counts the number of cycles of the known frequency oscillator and after counting a predetermined number of cycles, it sends out a control signal to activate relays to switch the system to the next operating stage. For each of these modes of operation, there are predetermined number of cycles of oscillations to provide enough time to complete each mode of operation and after that preset time, i.e., the preset number of oscillations, the system automatically enters the next step of operation. There is no predetermined time limit for the last mode of operation, i.e., "read" operation. In other words, the picture is displayed on monitor set 18 indefinitely until an operator gives some manual command.

The operator now has following three choices of actions. Number one, if the stored picture is satisfactory and the receiver is ready to receive a picture, the operator presses a button 101 marked "Xmit," i.e., "transmit," on unit 28. The function of the system when "Xmit" button 101 is pressed will be described later in detail.

Number two, if the stored picture in the storage tube is not satisfactory for any reason whatsoever, the operator may press a button 102 marked "Auto Defeat" on automatic control unit panel 28. When button 102 is pressed, all functions of the system are cancelled no matter what the system may be doing. In addition, this operation resets the system, whereby the picture information is written on the storage tube over again just as if the "Write" button was pressed as described hereinbefore. In other words, button 102 takes over and overrides system operation even after the "Xmit" button 101 is pressed.

Number three, if the operator requires approval from other persons before transmission of the stored picture, or if the operator has to wait for a period of time before the picture should be transmitted for any reason, a beam switch 10 on the automatic control unit panel 28 is actuated to "off" position. Switch 103 cuts off fast read amplifier 21 from the storage tube while the system is waiting or standing by for the transmission of the picture. Read out by fast read amplifier 21 takes away some stored charges from the storage tube, hence a long period of read out will eventually destroy the stored picture. Therefore, unless the picture is transmitted shortly after read out, the read out operation should be stopped after checking the picture.

When "Xmit" button 101 on automatic control unit panel 28 is pressed for the purpose of transmitting the stored picture to a receiver at the other end of the telephone line, the following action occurs. Storage unit 15 is cut-off through lead 117 until the receiving unit at the other end of a telephone line 118 becomes operationally ready to receive the picture. The purpose of this operation is the same as the beam switch 103 "off" position described above. Soon after storage unit 15 is cut-off, a 360 cycle synch-generator 22 sends out a 360 cycle A.C. voltage over lead 119 to an FM modulator 27 which in turn sends the 360 cycle voltage directly to the receiving unit through a telephone line depicted as 118. The 360 cycle signal is transmitted until the completion of the picture transmission. At the same time, 360 cycle sync generator 22 also sends out a 60 cycle voltage over lead 120 to a slow scan motor 23. The 60 cycle voltage signal is generated by a frequency divider network which divides 360 by six to provide the 60 cycle signal. This 60 cycle voltage turns slow scan motor 23 which is a synchronous motor whose speed is directly related to the frequency of the voltage source applied to it.

Figure 2:
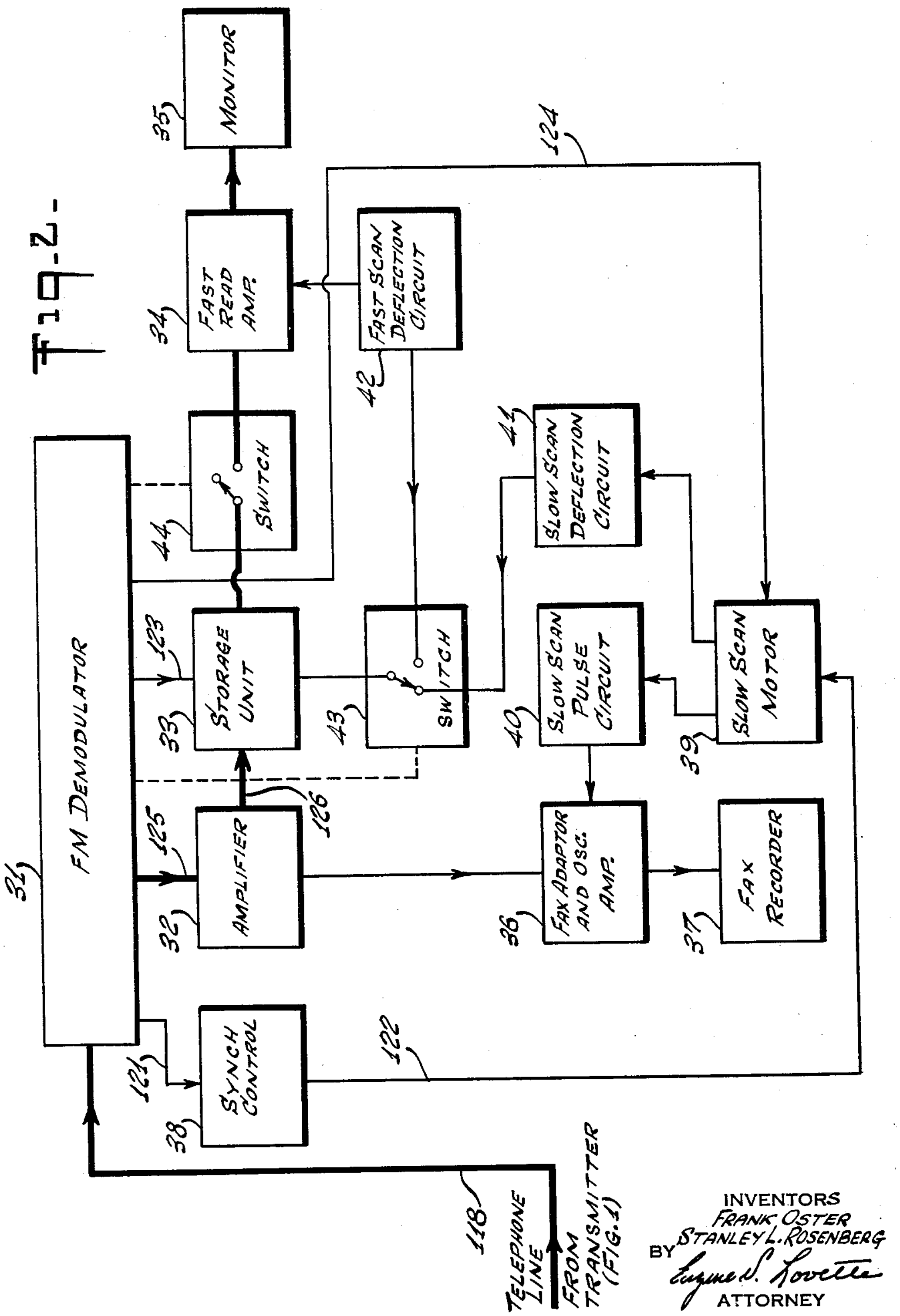
FIG. 2 illustrates schematically and diagrammatically a block diagram circuit constituting a receiver unit in accordance with the invention.

At the receiving end, FIG. 2, an FM demodulator unit 31 receives the 360 cycle signal and passes it by lead 121 to a synch control unit 38 which divides this 360 cycle frequency to a 60 cycle frequency signal and applies the 60 cycle voltage by lead 122 to a slow scan motor 39 which is identical to slow scan motor 23 of the transmitter. In this manner, two slow scan motors 23 and 39 are made to run at an identical speed. As the two motors 23 and 39 reach their full speeds, FM modulator 27 is caused to send out a burst of carrier signal, 2400 cycle signal for only 50 milli-seconds over line 118. Upon receiving this burst of carrier signal, FM demodulator 31 acts as an automatic control unit whereby a storage unit 33 by lead 123 is erased and primed to become operationally ready to receive the picture. In addition, FM demodulator 31 sends a control signal over lead 124 to slow scan motor unit 39 so that a slow scan deflection circuit 41 and a slow scan pulse circuit 40 generate a 4 cycle per second saw-tooth wave and a 4 pulse per second pulse wave, respectively. While slow scan deflection circuit 41 and slow scan pulse circuit 40 of the receiver unit are generating voltages, slow scan deflection circuit 24 and slow scan pulse circuit 29 of transmitter unit are also generating a saw-tooth wave and pulse wave, respectively. When automatic control unit 28 of the transmitter unit sends a control signal to FM modulator 27 to transmit the burst of carrier frequency, control unit 28 also sends a control signal to slow scan motor unit 23 so that slow scan deflection circuit 24 and slow scan pulse circuit 29 generate 4 cycle per second saw-tooth wave and 4 pulse per second pulse wave, respectively. In this way, slow scanning circuits of the transmitter and receiver unit operate simultaneously. Particular methods of generating saw-tooth wave and pulse wave and means to synchronize all these slow scanning voltages will be described hereinafter.

After storage unit 33 of the receiver unit becomes operationally ready to receive the picture and the synchronized 4 cycle per second signals for the horizontal deflections are being generated, the entire system goes through the operation of actual transmission of picture from storage unit 15 of the transmitter unit to storage unit 33 of the receiver unit. Operation of the system is as follows. Storage unit 15 which was cut off from the system temporarily is reconnected back to the system. Relay switch 19 is switched to normally open position, its alternate position, to connect slow scan deflection circuit 24 to storage unit 15 so that the scanning device in the storage unit 15 scans in slow speed. Relay switch unit 16 is switched to its alternate position, i.e., the normally open position to connect storage unit 15 to a slow read amplifier 20. Slow read amplifier 20 amplifies the signal read out of storage unit 15 at a slow speed and transmits this amplified signal to FM modulator unit 27 over the heavy flow line. In modulator 27, the 2400 cycle carrier wave is frequency modulated by the incoming signal from slow read amplifier 20 and then transmitted to the receiver unit through telephone line 118 along with the 360 cycle signal from 360 cycle sync generator unit 22.

Automatic control unit 28 sends another control signal to slow scan motor unit 23 so that slow scan deflection circuit 24 is caused to send out a vertical scan signal which is one cycle per three minutes saw-tooth wave. The horizontal sweep of 4 cycles per second saw-tooth wave is being generated already at this stage.

A permanent record of transmitted picture information may be made at the transmitter unit by recording on a Fax Recorder 25 while the picture is being transmitted to the receiver unit. Fax Recorder 25 is a commercially available recording unit which prints electrical signals on to paper in black and white line by electro-chemical means. The intensity of blackness of the printing is related to the voltage applied to the recorder. It has a printing pen unit which moves all the way to the left margin of the paper upon receiving a square pulse signal and moves to the right with uniform speed to reach the right margin in approximately one-quarter of a second. This writing pen does not move up and down, instead the paper moves. The specially chemical treated paper is wound on a roll and fed constantly to the printing section of the recorder while the 4 pulse per second pulse wave is being applied to the recorder. In three minutes' time, 720 pulses are applied to Fax Recorder 25 by slow scan pulse circuit 29 through Fax adaptor and oscillator amplifier unit 26. The 720 pulses feed paper approximately ⅘ length of the width of the paper so that the information printed forms ordinary rectangular shaped TV screen picture. Fax adaptor and oscillator amplifier unit 26 receives low voltage pulse wave from slow scan pulse circuit 29 and amplifies and reshapes the pulse wave acceptable to Fax Recorder 25 and it also receives the slow scanned picture information from slow read amplifier 20 and converts the signal into adaptable form for Fax Recorder 25 and applies same to recorder 25 to make the permanent record. This completes the description of the actions occurring at the transmitter end when Xmit button 101 is pressed.

Upon receiving the 360 cycle sync signal at the receiver unit, slow scan motor 39 stated running. When motor 39 arrives at its operational speed, a burst of carrier signal for 50 milliseconds is received whereby storage unit 33 is erased and primed. At the same time, slow scan deflection circuit 41 and slow scan pulse circuit 40 have started to generate 4 cycle per second saw-tooth wave and 4 pulse per second pulse wave.

Furthermore, when the 2400 cycle carrier signal is received for 50 milli-seconds interval, a timer relay in demodulator unit 31 sends another signal to slow scan motor unit 39 over lead 124 so that slow scan deflection circuit 41 sends out a vertical scan signal of one cycle per three minutes saw-tooth wave. FM demodulator unit 31 receives the modulated picture information signal for three minutes. The received modulated signal is demodulated by FM demodulator unit 31 and sent to storage unit 33 through amplifier 32 over the heavy flow lines 125, 126. The scanning device in storage unit 33 is connected to slow scan deflection circuit 41 through a switch 43 which is operating as shown in FIG. 2 so that storage unit 33 is synchronized with the scanning device of the transmitter unit. At the same time, the picture information that is being stored is permanently recorded on a Fax recorder unit 37. Fax adaptor and oscillator amplifier unit 36 receive the picture information from amplifier unit 32 and the 4 cycle per second synchronized pulse wave from slow scan pulse circuit 40 to apply same properly to Fax recorder 37 in the same manner as the operation of recorder 25 in the transmitter unit.

Upon the completion of the three minute time interval, i.e., at the completion of transmission, automatic control unit 28 sends out control signals, i.e., one control signal stops transmission by FM modulator 27; the second stops 360 cycle sync generator 22 to stop slow scan motor 23 which in turn stops slow scan voltage generation; the third sets the slow scanning circuits to their beginning status positions; and the fourth sets the relay switches 13, 16 and 19 to normally closed positions as shown in FIG. 1.

At the receiver unit, slow scan motor 39 stops because the 360 cycle voltage signal is no longer being received from the transmitter. FM demodulator 31 senses the termination of transmission and sends out control signals, i.e., one, to set the storage unit 33 to a "read out" mode of operation; and a second to set the switches 43 and 44 to their alternate or normally open positions so that the stored picture may be viewed on a monitor TV set 35. FIG. 2 shows switches 43, 44 in their normally closed positions. For this operation, an independent fast scan deflection circuit 42 controls the scanning devices in storage unit 33 (through switch 43) and in a monitor set 35. A fast read amplifier 34 reads out the stored picture information from storage unit 33 through switch 44 and transmits the picture to monitor set 35 for approximately ten minutes.

At the end of ten minutes, FM demodulator 31 operates switches 43, 44 to return them to their normally closed positions thereby cutting off monitor set 35. However, should the transmitter unit transmit the next picture information before completion of the aforementioned ten minute interval, FM demodulator 31 will cause switches 43, 44 to return to their normally closed positions in response to the first burst of carrier signal received by demodulator 31, thus guaranteeing that the receiver unit receives all the picture information transmitted by the transmitter unit.

Automatic control unit 28 also includes a pair of controls shown as manual advance control 104 and a reset control 105. Controls 104 and 105 are used for the purpose of testing system operation and, otherwise, are not normally used for operation of the system. When manual advance control 104 is actuated "on," it cuts off automatic time control whereby operation of the system from that moment on advances manually. Use of manual advance control 104 will slow down system operation. In addition, if desired, manual advance control 104 may be turned off during a particular mode of operation to enable one to ascertain a malfunction and correct it. In operation, the system may be set on advance 104 and reset control 105 may be actuated to cause the system to advance immediately from one step to the next step of the sequence of the mode of operation, and this may be repeated until the system reaches a particular or desired mode of operation. In other words, reset control 105 will be used to step the system from one step in the sequence to the next without going through the interval for each step in order to bring the system to the desired point of operation without waiting for the fulfillment of any of the prior steps of operation in the sequence.

Reference is now made to FIGS. 3 to 8 which illustrate the electro-mechanical means for generating the slow scan electric signals. Slow scan motors 23 and 39 each involve a synchronous motor 50 incorporating an operatively associated gear train for providing an output shaft 51 turning at the constant speed of 240 r.p.m. Each synchronous motor 50 is energized by the 60 cycle reference signal provided by the 360 cycle sync generator 22 in the transmitter and by the sync control unit 38 in the receiver. Each motor 50 is designed to operate at a constant speed whereby its output shaft 51 turns at a constant speed of 240 r.p.m. By means of further reduction gears 53, 54, another output shaft 52 is designed to rotate at one revolution per three minutes. When the horizontal sweep signal of 4 cycles per second signal is desired, the magnetic clutch 55 is energized to turn a driven shaft 56 at the same speed as shaft 51, i.e., 240 r.p.m. Shaft 51 is the input turning means for clutch 55. A rotary potentiometer 57 generates the 4 cycles per second saw-tooth wave. The circuit diagram and the developed saw-tooth wave shape is shown in FIGS. 5 and 6. A rotary switch 58 generates the 4 pulse per second pulse wave and the circuit diagram of the rotary switch 58 and the pulse wave shape is shown in FIGS. 7 and 8.

It will be understood that the slow scan motors 23 and 39 are identical. Moreover, the slow scan deflection circuits 24, 41 and the slow scan pulse circuits 29, 40 in the transmitter and receiver units, respectively, also are identical. Hence, the following description taken in correlation with FIGS. 3 to 8 applies equally to the transmitter and receiver units. In FIG. 5, a rotating wiper arm 65 is keyed to turn with driven shaft 56. Arm 65 makes continuous electrical contact with a circular potentiometer element 64. A centered tapped D.C. 2E, depicted as 67, is connected across the respective ones of the closely spaced ends of potentiometer element 64. The center tap of source 67 is grounded. A stationary brush 66 through a slip-ring element is in continuous electrical contact with arm 65. The output voltage 68 is the voltage between wiper arm 65 and ground. When wiper arm 65 is at its starting position as indicated in FIG. 5, output voltage 68 between wiper arm 65 and ground is minus E volts. As wiper arm 65 turns clockwise as indicated, output voltage 68 increases. Output voltage 68 becomes a zero value when wiper arm 65 reaches the half-way point along potentiometer element 64. Output voltage 68 becomes plus E volts when arm 65 makes almost its complete turn about potentiometer 64 and is at the high potential end thereof. As arm 65 turns a little further from its plus E volts end position to return to its starting end position, voltage 68 suddenly drops to minus E volts. Since arm 65 rotates uniformly at a constant speed, it provides the periodic saw-tooth wave shown in FIG. 6. As noted hereinbefore, shaft 56 is designed to turn at 240 r.p.m. which is four revolutions per second, whereby output voltage 68 is a saw-tooth wave as shown in FIG. 6 with a period of one-quarter second.

FIG. 7 illustrates the circuit 58 for developing the four pulse per second signal and involves a rotary potentiometer having a continuous conductive ring 69, which ring is selected to extend circumferentially almost 360 degrees. The ring circumference is completed by a small arcuate segment 70 of conductive material lying between the ends of ring 69. Potentiometer 58 also involves a wiper arm 71 keyed to shaft 56 to turn therewith. Wiper arm 71 is in continuous contact with ring 69 or ring 70, depending upon its position. A brush 73 in contact with arm 71 provides an output voltage 74 with respect to ground. The grounded and negative side of a D.C. source 72 is connected to the starting end of ring 69. The positive side of source 72 is connected to the center of arcuate segment 70. When arm 71 is at its starting position as indicated in FIG. 7, the output voltage 74 between arm 71 and ground is zero because ring 69 is grounded. With continuous turning of wiper arm 71 in accordance with shaft 56, the zero voltage output 74 continues until wiper arm 71 leaves slidable contact with ring 69 and makes contact with ring segment 70 at which point output voltage 74 suddenly jumps to the value of voltage source 72. The duration of the output voltage pulse 74 is determined by the length or duration of contact of arm 71 along ring segment 70.

FIG. 8 illustrates the output voltage 74 and shows same as a pulse of 0.5 volt having a 25 milli-second duration. The overall period of the pulse signal 74 is 0.25 second or 250 milli-seconds, the same as for output 68. As seen from the figures, the pulse duration may be increased or decreased by increasing or decreasing the arcuate length of ring segment 70. The pulse height may be varied by adjusting the value of source voltage 72.

When the vertical scan sweep, i.e., the one cycle per three minute saw-tooth wave, is desired, a magnetic clutch 61 is suitably energized whereby its driven shaft 62 is caused to turn at the same speed as output shaft 52, Shaft 62 is the input turning means for clutch 61. Shaft 62 is designed to operate the wiper of a rotary potentiometer 63 which is identical in all respects with potentiometer 57 illustrated in FIG. 5, except that it will be understood that the wiper arm of potentiometer 63 turns at the rate of ⅓ r.p.m. because of the reduction provided by gear means 53, 54. The output voltage from potentiometer 63 is shown in FIG. 6, but has a period of three minutes.

In the generation of the three voltage signals described hereinbefore, it was assumed that at the start of voltage generation that the wiper arms of the three potentiometers 57, 58, 63 were all in their respective proper starting positions and thus synchronized. However, this need not be the situation with respect to the wiper arms of potentiometers 57, 58. At the end of a voltage generation, magnetic clutches 55, 61 are open or de-energized and motor 50 is stopped. Since shaft 56 was turning at 240 r.p.m. during operation, it is expected that shaft 56 will continue to run or overtravel due to its inertia after clutch 55 is opened. Therefore, it is necessary to regulate shaft 56 whereby wiper arms 65, 71 are positioned to be at their proper starting positions for voltage generations at the start of the next cycle of operation. For this reason, a heart-shaped cam 59 as illustrated in FIG. 4 is keyed to turn with shaft 56. A cam follower 61 is provided with a roller 60. Roller 60 is adapted to ride along the edge of cam 59 after clutch 55 is disengaged. A spring 62 is connected to follower 61 to pull roller 60 downwardly hard on cam 59 with sufficient force so that cam 59 is caused to turn axially one way or the other and carry shaft 56 therewith, until roller 60 comes to rest in a V-shaped notch 59*a* of cam 59. When roller 60 drops against cam 59, roller 60 will strike the rising slope of the cam edge on either side of notch 59*a*, or for the optimum condition, roller 60 will fall directly into notch 59*a*.

When roller 60 is acting on cam 59, clutch 55 is disengaged whereby shaft 56 responds to the action of roller 60 against cam 59. By reason of the downward force transmitted by roller 60 against the notched portion of the cam, notch 59*a* represents the most stable position for roller 60 along the edge of cam 59. A moment before magnetic clutch 55 is energized for the next cycle of operation, a solenoid 63 is energized to pull arm 61 and thus roller 60 upward away from cam 59 so that shaft 56 is free to rotate under the influence of clutch 55. Arm 61 pivots about 61*a* when lifted by solenoid 63. Hence, it will be understood that when clutch 55 is de-energized and thus disengaged, roller 60 is acting upon cam 59 which will turn shaft 56 until cam 59 is aligned by roller 60. From the geometry of the mechanism, when clutch 55 is de-energized, notch 59*a* will be confronting roller 60 in preparation for the aforesaid regulating action. For the optimum situation, V-shaped notched will be directly opposite roller 60, whereby the latter drops directly into the notch, otherwise some regulating action will take place as described hereinbefore. By presetting cam 59 axially on shaft 56, the foregoing regulating action will properly and automatically position arms 65, 71 of potentiometers 57, 58 at their desired starting positions for the generation of these slow scan voltages for the next picture transmission operation. The energizing signals for actuating solenoids 63, 63 in the transmitter and receiver slow scan motor circuits 23, 39 are supplied, respectively, by control unit 28 and demodulator-control unit 31 just before the burst of carrier signal effects energization of clutches 55, 55 in these same circuits. When demodulator 31 receives the 50 millisecond carrier burst, it responds as a control to supply the energizing signal to clutch 55 in circuit 39 and at the same time control unit 28 is supplying the energizing signal to actuate clutch 55 in unit 23. Solenoids 63, 63 remain energized until deactuated by their respective control units 28, 31 at the completion of picture transmission, at which time the energizing signals are turned off and the two solenoids are deactuated to place shafts 56 under the control of their corresponding cam followers 60. It will also be understood that the energizing signals for actuating clutches 61, 61 of the transmitter and receiver units 23, 39 are also supplied by controls 28 and 31, respectively.

Shaft 62 is designed to rotate at a very slow speed, consequently there is little concern of overtravel by shaft 62 due to inertia. Furthermore, since transmission of the picture information takes exactly three minutes, the circuit for energizing clutch 61 may be designed to de-energize clutch 61 when output voltage 74 of rotary potentiometer 63 drops from its maximum to its minimum voltage. This in conjunction with the slow speed of turning for shaft 62 assures one that the wiper arm of potentiometer 63 is for all practical purposes properly positioned upon the start of the generation of the three minute per second saw-tooth wave.

As depicted in FIG. 3, the transmitter and receiver units will each have slow scan voltage generator means. In operation of the system, it is essential that the scanning signals are properly synchronized. The two motors 50 of the transmitter and receiver units are started almost simultaneously by the 360 cycle sync generator 22. Magnetic clutch 55 in the receiver unit slow scan motor 39 is energized when the burst of carrier signal is received by FM demodulator 31. Automatic control unit 28 energizes magnetic clutch 55 in slow scan motor unit 23 as the FM modulator 27 receives the control signal to send out the aforesaid burst of carrier signal. Therefore, both magnetic clutches 55 are energized almost at the same time. However, one should expect some time delay in the transmission of a signal through telephone line 113 and further no two magnetic clutches respond identically when energized. Therefore, some off-synchronism between the two 4 cycle per second signals may be present. If such is the case, this will be detected at the receiver unit by a shift of a test picture information on monitor set 35 to the right or to the left. When such off synchronism is observed, rheostat element 64 and the conductive elements 69 and 70 may be intentionally rotatably shifted about the axis of shaft 56 as an adjustment so that the wiper arms 65, 71 of units 57, 58 in the receiver do not start at the indicated starting positions as depicted in FIGS. 5 and 7, but are adjusted to start at some other preshifted position whereby output voltages 68, 74 at the receiver end of the system are perfectly synchronized with the similar signals in the transmitter unit. It will be understood that the problem of synchronizing the vertical sweeps taken from potentiometers 63, 63 in the transmitter and receiver units is not critical because the period of this signal is three minutes. Consequently, if there is some off-synchronism, even as much as one-half second, it will not be detected on the screen.

For the purpose of obtaining the shifting adjustment as described hereinbefore, any conventional means may be employed for shifting a rotary rheostat element with respect to its correlated wiper arm, for example, rheostat element 64 may be contained in a housing 57*a* to turn therewith. Housing 57*a* is depicted diagrammatically and includes an extension 90 having a lock screw 91 engaging an arcuate slot 92, which slot is contained in some reference structure. This arrangement, among a number of other equivalents, will permit housing 57*a* and thus rheostat element 64 to be rotated about the axis of its wiper rotation.

When off-synchronization is observed on the monitor, screw 91 may be loosened to permit rotation of housing 57*a* which carries rheostat element 64 therewith about the axis of shaft 56. After off-synchronization between the transmitter and receiver is eliminated and a synchronized picture is observed on the monitor, housing 57*a* is locked by screw 91 in the adjusted position. Similarly, conductive elements 69 and 70 of potentiometer 58 are also mounted on or carried by another housing which is ganged to housing 64*a*. Elements 69, 70 are rotated as a unitary body also about the axis of shaft 56 upon making the aforesaid synchronizing adjustment.

The potentiometers 57, 58 in the transmitter unit also may employ the foregoing shifting adjustment means if for any reason such adjustment is desired during operation of the system.

From FIG. 3, it will be observed that slow scan motors 23 and 39 each involve a synchronous motor 50 for driving the individual magnetic clutches 55, 61, the latter through gears 53, 54. Each of these motors 23, 39 also includes the cam 59 and its operatively associated follower arm and roller mechanisms 60, 61 for properly aligning the transmitter and receiver shafts 56 for starting positions. In addition, it will be observed from the same figure that each slow scan deflection circuit 24 and 41 will include a 4 cycle per second saw-tooth generator 57 and the three minute period saw-tooth generator 63. Furthermore, each slow scan pulse circuit 29 and 40 will include a pulse generator 58.

It is intended that all matter contained in the above description or shown in the accompanying drawings shall be interpreted as illustrative and not in a limiting sense.

We claim:

1. A system for transmitting video picture information through telephone lines to a receiver unit remotely located from a transmitter unit comprising; video camera means for taking video picture information; generator means for providing a controlled reference signal for said system; video storage means for storing the video information received from said camera means for a selected interval until desired for transmission to said receiver unit; FM modulator means for generating a carrier signal for transmission over a telephone line; slow read amplifier means for detecting said stored video information pursuant to a relatively slow scan frequency and for transmitting same to said modulator means; said FM modulator means modulating said carrier signal with the video signal received from said slow read amplifier and transmitting the modulated carrier signal to a telephone line; sync-generator means responsive to said first generator means for developing a reference frequency signal; slow scan deflection means including, a synchronous motor responsive to said reference frequency signal and having an output shaft turning at a prescribed r.p.m., clutch means driven by said output shaft and having a driven shaft adapted to turn at a prescribed r.p.m. which is a function of said output shaft r.p.m., a rotary potentiometer having a circular rheostat element and an operatively associated wiper arm in continuous contact with said element, said element having first and second spaced ends, a center-tapped source of D.C. voltage having a low potential side connected to one element end and a high potential side connected to the other element end, said center tap being grounded, said wiper arm being keyed to said driven shaft to turn therewith, the output voltage from said wiper arm to ground is a function of the position of said wiper arm along said element whereby said output voltage is a linear saw-tooth wave having a period which is a function of the r.p.m. of said driven shaft, gear train means turning at a relatively very slow rate of r.p.m. in response to turning of said synchronous motor, second clutch means driven by said gear train and having an operatively associated second driven shaft adapted to turn at a prescribed r.p.m. which is a function of said output shaft turning, a second rotary potentiometer having a circular rheostat element and an operatively associated wiper arm in continuous contact with the last-mentioned element, said last-mentioned element having first and second spaced ends, a second center-tapped source of D.C. voltage having a low potential side connected to one element end and a high potential side connected to the other element end of said last-mentioned potentiometer element, said center tap being grounded, said last-mentioned wiper arm being keyed to said second driven shaft to turn therewith, the output voltage from said last-mentioned wiper arm to ground is a function of the position of said wiper arm along said second element, whereby said output voltage is a linear saw-tooth wave having a period which is a function of the r.p.m. of said second driven shaft; means coupling said slow scan output voltages to said storage unit whereby the horizontal and vertical scanning frequencies for said storage unit are determined by the individual outputs of said rotary potentiometers, and means for actuating said clutch means as the picture information from said storage unit is being fed to said FM modulator for transmission to said receiver over said telephone line.

2. A system as defined in claim 1 wherein said receiver unit comprises: means for demodulating the modulated carrier signal received from said FM modulator over said telephone line; said reference frequency signal also being transmitted over said telephone line to said receiver unit; means responsive to said reference frequency signal for providing a second reference frequency signal; video storage means for storing the video picture information received from said demodulator for a selected interval of time until desired for display, and slow scan deflection means including a synchronous motor responsive to said second reference frequency signal and having an output shaft turning at a prescribed r.p.m., first and second clutch means individually driven by said last-mentioned output shaft and each having a driven shaft adapted to turn at a prescribed r.p.m. equally respectively to the r.p.m.'s of the correlated driven shafts of said clutches in the transmitter unit, first and second rotary potentiometers each having a circular rheostat element and an operatively associated wiper arm in contact with its correlated element, said elements having first and second spaced ends, a center-tapped source of D.C. voltage for the individual potentiometers wherein each source has a low potential side connected to one element end and a high potential side connected to the other element end of the correlated potentiometer elements, said center taps being grounded, each wiper arm being keyed to an individual driven shaft to turn therewith, the output voltage from each wiper arm to ground is a function of the position of such wiper arm along its operatively associated element, whereby each output voltage is a linear saw-tooth wave having a period which is a function of the r.p.m. of its correlated wiper, means for coupling said output voltages to said storage unit for regulating the horizontal and vertical scanning frequencies thereof, and means for actuating said clutch means as picture information is being fed to said storage means.

3. In a system for transmitting video picture information through telephone lines to a receiver unit remotely located from a transmitter unit wherein said system transmitter unit has video camera means for taking video picture information, generator means for providing a controlled reference signal for said system, video storage means for storing the video information received from said camera means for a selected interval until desired for transmission to said receiver unit, FM modulator means for generating a carrier signal for transmission over a telephone line, slow read amplifier means for detecting said stored video information pursuant to a relatively slow scan frequency and for transmitting same to said modulator means, said FM modulator means modulating said carrier signal with the video signal received from said slow read amplifier and transmitting the modulated carrier signal to a telephone line, sync generator means responsive to said first generator means for developing a reference frequency signal, the combination defining slow scan deflection means for said system transmitter comprising, synchronous motor means responsive to said reference frequency signal and having an output shaft turning at a prescribed r.p.m., first and second clutch means individually driven by said synchronous motor, each clutch means having a driven shaft and such shaft turning upon actuation of its correlated clutch means at a prescribed r.p.m., first and second potentiometer means each having a circular rheostat element and an operatively associated wiper arm in contact with its correlated element, each element having first and second spaced ends, a center-tapped source of D.C. voltage for the individual potentiometers wherein each source has a low potential side connected to one element end and a high potential side connected to the other element end of the correlated potentiometer elements, said center taps being grounded, each wiper arm being keyed to an individual one of said driven shafts to turn therewith, the output voltage from each wiper arm to ground is a function of the position of such wiper arm along its operatively associated element, whereby each output voltage is a linear saw-tooth wave having a period which is the function of the r.p.m. of its correlated wiper, means for coupling said output voltages to said storage unit whereby the horizontal and vertical scanning frequencies for said storage unit are determined by the individual outputs of said potentiometers, and means for actuating said clutch means during the interval of time said picture information from said storage unit is being fed to said FM modulator for transmission to said receiver over said telephone line.

4. In a system as defined in claim 3 wherein said system transmitter unit also has fast read amplifier means for detecting the stored video signal information pursuant to a fast scan frequency, monitor means for displaying the video signal supplied by said fast read amplifier means, and a fast deflection circuit, said combination further including, first switch means for coupling said fast read amplifier means to said storage unit means for displaying the video signal on said monitor means and for alternately coupling said storage unit to said slow read amplifier means for transmitting the video picture signal to said FM modulator for transmission to said receiver unit, and second switch means for coupling said slow scan output voltages to said storage unit as the stored signal is being detected by said slow read amplifier means and for alternately coupling said fast deflection circuit to said storage unit as the stored unit is being read by said fast read amplifier means.

5. In a system for transmitting video picture information as defined in claim 3 wherein said system transmitter unit also having facsimile recorder means for recording the video signal transmitted to said receiver unit, the combination further including a slow scan pulse circuit for said facsimile recorder means and comprising, a rotary potentiometer having a circular conductive ring element extending circumferentially less than 360 degrees and having spaced ends, an arcuate and relatively short conductive ring element circumferentially aligned between the spaced ends of said first element, a D.C. source having one potential side grounded and connected to said first ring element and the other potential side connected to the relatively short ring element, and a wiper arm keyed to one of the clutch driven shafts of said transmitter unit to turn therewith, said arm being adapted to contact alternately said first and short rings, the pulse voltage output from said wiper arm to ground is a function of said D.C. source and the circumferential lengths of said first and short rings and has an overall period which is a function of the r.p.m. of the correlated wiper arm.

6. A system as defined in claim 3 wherein said system receiver unit has a FM demodulator for demodulating the video carrier signal received by said receiver, said reference frequency signal also being transmitted over said telephone line to said receiver unit, means responsive to said reference frequency signal for providing a second reference frequency signal, video storage means for storing the video picture information received from said demodulator for a selected interval of time until desired for display, the combination defining slow scan deflection means for said receiver unit comprising, synchronous motor means responsive to said second reference frequency signal and having an output shaft turning at a prescribed r.p.m., first and second clutch means individually driven by said synchronous motor, each clutch means having a driven shaft and such shafts turning upon actuation of its correlated clutch means at a prescribed r.p.m. equal, respectively, to the r.p.m.'s of the correlated driven shafts of said clutch means in the transmitter unit, first and second potentiometers each having a circular rheostat element and an operatively associated wiper arm in contact with its correlated element, each element having first and second spaced ends, a center-tapped source of D.C. voltage for the individual potentiometers wherein each source has a low potential side connected to one element end and a high potential side connected to the other element end of the correlated potentiometer elements, said center taps being grounded, each wiper arm being keyed to an individual driven shaft to turn therewith, the output voltage from each wiper arm to ground is a function of the position of such wiper arm along its operatively associated element, whereby each output voltage is a linear saw-tooth wave having a period which is a function of the r.p.m. of its correlated wiper, means for coupling said slow scan output voltages to said storage unit whereby the horizontal and vertical scanning frequencies for said storage unit are determined by the individual outputs of said potentiometers, and means for actuating said clutch means as said picture information is being fed to said storage unit.

7. A system as defined in claim 6 wherein corresponding ones of said clutch driven shafts of said transmitter and receiver units rotate at a rate of 240 r.p.m. and corresponding ones of the other clutch driven shafts of said transmitter and receiver units turn at a rate of one-third r.p.m.

8. A system as defined in claim 6 further including means for positioning the wiper arms of the rotary potentiometers of said transmitter and receiver units in order to regulate said wiper arms to start at a preselected position with respect to their correlated rheostat elements at the start of generation of the slow scan output voltages comprising, first and second similarly shaped cams individually keyed to corresponding ones of said transmitter and receiver driven clutch shafts to turn therewith, said cams having heart-shaped cam edges, said cams having sloping and converging walls along the edges thereof to define the V-shaped notches of the heart-shaped edges, individual cam followers for engaging each cam edge, means for forcing each follower to ride hard against its correlated cam edge and for alternately withdrawing said followers away therefrom, said means being actuated to cause said followers to engage the correlated cam edges when the clutch means driving the shaft keyed to such cam is not actuated, whereby such shaft is free to turn under the influence of the force imparted thereto by the correlated follower riding a sloping wall of the cam keyed thereto, each cam being normally oriented on its shaft with its V-shaped walls confronting its follower when the clutch thereof is disengaged, whereby said follower engages the sloping notched walls to turn said cam and thereby carrying the wiper arm keyed to the same shaft rotatably about the shaft axis, the stable starting position being defined by each follower engaging the center of the notch of its corresponding cam, said notch being aligned with respect to its cam shaft axis to position the wiper arm keyed thereto at a selected position along its element prior to actuation of the correlated clutch, said followers during clutch actuation being withdrawn from cam engagement to free the correlated shafts from the influence of the followers.

9. In a system for transmitting video picture information as defined in claim 6 wherein said system receiver unit also has facsimile recorder means for recording the video signal received by said receiver unit, the combination further including a slow scan pulse circuit for said facsimile recording means and comprising, a rotary potentiometer having a circular conductive ring element extending circumferentially less than 360 degrees and having spaced ends, an arcuate and relatively short conductive ring element circumferentially aligned between the spaced ends of said first element, a D.C. source having one potential side grounded and connected to said first ring element and the other potential side connected to the relatively short ring element, and a wiper arm keyed to one of the clutch driven shafts of said transmitter unit to turn therewith, said arm being adapted to contact alternately said first and short rings upon turning of said arm, the pulse voltage output between said wiper arm to ground is a function of said D.C. source and the circumferential lengths of said first and short rings and has an overall period which is a function of the r.p.m. of said wiper arm.

10. A system as defined in claim 6 wherein at least one of said potentiometer means in said receiver unit includes means for rotatably adjusting the rheostat element thereof with respect to the turning axis of its wiper arm, whereby the saw-tooth wave generated by said potentiometer may be synchronized with the saw-tooth wave generated by the corresponding potentiometer in said transmitter unit.

11. Means for generating a slow scan linear saw-tooth wave shaped voltage comprising, motor means, shaft means driven by said motor means for turning at a prescribed r.p.m., a rotary potentiometer having a circular rheostat element and an operatively associated wiper arm in contact with such element, said element having spaced ends, a center tapped source of D.C. voltage wherein said source has a low potential side connected to one element end and a high potential side connected to the other element end and said center tap is grounded, said wiper arm being keyed to said shaft to turn therewith when said shaft is positively driven by said motor means, the voltage output between said wiper arm to ground is a function of the position of such wiper arm along said element, whereby the output voltage is a linear saw-tooth wave having a period which is a function of the r.p.m. of said wiper, means for regulating said wiper arm to start at a preselected position and including a cam keyed to said shaft to turn therewith and having a heart-shaped cam edge defined by sloping and converging cam edge walls forming the V-shaped notch of said heart-shape cam edge, a cam follower for engaging said cam edge, means for forcing said follower to ride hard against said cam edge and for alternately withdrawing said follower away therefrom, said means being actuated to cause said follower to engage said cam at a preselected time prior to the start of positive driving said shaft by said motor, whereby said wiper arm is free to turn under the influence of the force imparted thereto by said follower riding the sloping walls of said cam, said cam normally being oriented with its V-shaped walls confronting said follower at said preselected time, whereby said follower engages the sloping notch walls to turn said cam and thereby carrying the wiper arm keyed therewith, the stable starting position being defined by said follower engaging the center of said notch, said notch being aligned with respect to the shaft axis to position said wiper arm at a selected starting position along its element prior to positive turning of said shaft by said motor, said follower being withdrawn from cam engagement as said shaft is being positively turned by said motor to free said shaft from the influence of said follower.

12. Means for generating a slow scan pulse wave shaped voltage comprising, motor means, shaft means driven by said motor means for turning at a preselected r.p.m., a rotary potentiometer having a circular conductive ring element extending circumferentially less than 360 degrees and having spaced ends, an arcuate and relatively short conductive ring element circumferentially aligned between said spaced ends, a D.C. source having one potential side grounded and connected to said first ring element and the other potential side connected to the relatively short ring element, a wiper arm keyed to said shaft to turn therewith at a prescribed r.p.m. when said shaft is driven positively by said motor means, said arm being adapted to contact alternately said first and short rings, the pulse output voltage between wiper arm to ground is a function of said D.C. source and the circumferential lengths of said rings and has an overall period which is a function of said wiper arm r.p.m., means for regulating said wiper arm to start at a preselected position and including a cam keyed to said shaft to turn therewith and having a heart-shaped cam edge defined by sloping and converging cam edge walls forming the V-shaped notch of said heart-shape cam edge, a cam follower for engaging said cam edge, means for forcing said follower to ride hard against said cam edge and for alternately withdrawing said follower away therefrom, said means being actuated to cause said follower to engage said cam edge at a preselected time prior to the start of positive driving said shaft by said motor, whereby said wiper arm is free to turn under the influence of the force imparted thereto by said follower riding the sloping walls of said cam, said cam normally being oriented with its V-shaped walls confronting said follower at said preselected time, whereby said follower engages the sloping notch walls to turn said cam and thereby carrying the wiper arm keyed therewith, the stable starting position being defined by said follower engaging the center of said notch, said notch being aligned with respect to the shaft axis to position said wiper arm at a selected starting position along its element prior to positive turning of said shaft by said motor, said follower being withdrawn from cam engagement as said shaft is being positively turned by said motor means to free said shaft from the influence of said follower.

References Cited in the file of this patent

UNITED STATES PATENTS 2,231,929 Lyman ---------------- Feb. 18, 1941
2,976,356 Fathauer -------------- Mar. 21, 1961